United States Patent [19]
Grigor et al.

[11] Patent Number: 6,023,281
[45] Date of Patent: Feb. 8, 2000

[54] METHOD AND APPARATUS FOR MEMORY ALLOCATION

[75] Inventors: Gordon Fraser Grigor, Toronto; Vladimir F. Giemborek, Richmond Hill; John E. Haberfellner, Toronto, all of Canada

[73] Assignee: ATI Technologies, Inc., Thornhill, Canada

[21] Appl. No.: 09/033,371

[22] Filed: Mar. 2, 1998

[51] Int. Cl.[7] .................................................. G06F 15/167

[52] U.S. Cl. ........................ 345/512; 345/515; 345/502; 345/521; 711/153; 711/170; 711/173

[58] Field of Search ...................................... 345/501–503, 345/507–509, 512, 521, 515, 516; 711/170–173, 147, 153

[56] References Cited

U.S. PATENT DOCUMENTS

| | | | |
|---|---|---|---|
| 5,574,836 | 11/1996 | Broemmelsiek | 395/127 |
| 5,793,385 | 8/1998 | Nale | 345/515 |
| 5,815,168 | 9/1998 | May | 345/516 |
| 5,930,827 | 7/1999 | Sturges | 711/170 |

*Primary Examiner*—Kee M. Tung
*Attorney, Agent, or Firm*—Markison & Reckamp, PC

[57] ABSTRACT

A method and apparatus for memory allocation in a multi-processor system is accomplished by mapping portions of a shared memory to a first and second processor. The mapping is performed such that either of the processors' portions can be enlarged or reduced based on the memory that is located between the portions allocated to the processors. When a processor requests additional memory and there is sufficient free memory between the processors' respective portions, the appropriate amount of the free memory is allocated to the requesting processor.

17 Claims, 3 Drawing Sheets

METHOD AND APPARATUS FOR MEMORY ALLOCATION

FIELD OF THE INVENTION

This invention relates generally to the allocation of memory, and more particularly to the allocation of memory in video graphics circuits.

BACKGROUND OF THE INVENTION

Computers are known to include processors, memory, and display devices. Advancements in computer technology have enabled computers to be used in more and more applications where diverse displaying options are desirable. Video graphics circuits that are able to provide these diverse displaying options need to be able to do so in a cost efficient manner without consuming large amounts of processor and memory resources.

Video graphics circuits store information relating to the display, or video graphics data, in memories. Video graphics data stored in memory must be stored in such a manner that it can be stored and retrieved quickly enough for the graphics processor to update and display the image rapidly and efficiently. For this reason, video graphics data is often mapped to the memory in a linear or tiled fashion. Data that is linearly mapped in memory has sequential pixels of a single row stored sequentially in the memory. Tile mapping breaks the display into blocks or tiles such that sequential pixels within each block are stored sequentially, thus localizing the storage of individual blocks rather than entire rows.

In order to accommodate multiple displays, multiple graphics processors using multiple memories are often required. These multiple processors may require many different amounts of memory based on the displaying parameters selected. For this reason, processors often require the flexibility to change the amount of memory they are allocated for storage of video graphics data. For example, a display may increase its resolution, thus requiring additional memory to store the information relating to the added resolution. In such systems, large blocks of memory may have to be added or subtracted from the portion of memory allocated to a particular graphics processor. In such instances, memory-mapping techniques such as virtual addressing are ineffective, as they cannot meet the speed and efficiency requirements of video graphics processors. Therefore, the block of memory allocated to a video graphics processor for storage of video graphics data should be a contiguous block of memory. This is necessary to satisfy the sequential mapping constraints of linear and tile mapping techniques. In multiple processor systems where each processor has a corresponding memory, each of the multiple memories must be of such a size as to accommodate the maximum memory requirements for its corresponding processor, even though all of the memory may only be used occasionally.

In other words, a processor may have to have a 4-Megabyte memory for video graphics data even though it only uses 1 Megabyte in normal operation. The additional 3 Megabytes may only be required for occasional large-matrix, high-resolution operations, and therefore left idle the majority of the time.

Therefore, a need exists for a memory allocation technique that reduces the amount of memory required when multiple processors are used, where the allocation technique allows the size of memory allocated to a particular processor to change while still allowing for linear or tile mapping of the graphics data.

DETAILED DESCRIPTION OF A PREFERRED EMBODIMENT

Generally, the present invention provides a method and apparatus for memory allocation in a multi-processor system that improves memory usage and flexibility. This may be accomplished by mapping portions of a shared memory to a first and second processor. The mapping is performed such that either of the processors' portions can be enlarged or reduced based on the memory located between the portions already mapped to the processors. When a processor requests additional memory and there is sufficient free memory between the processors' respective portions, the appropriate amount of the free memory is allocated to the requesting processor. Sharing memory in this manner allows the memory allocation to each of the processors to be flexible, and the allocated blocks remain contiguous, which allows for mapping techniques that are required to support video graphics data.

Figure 1:
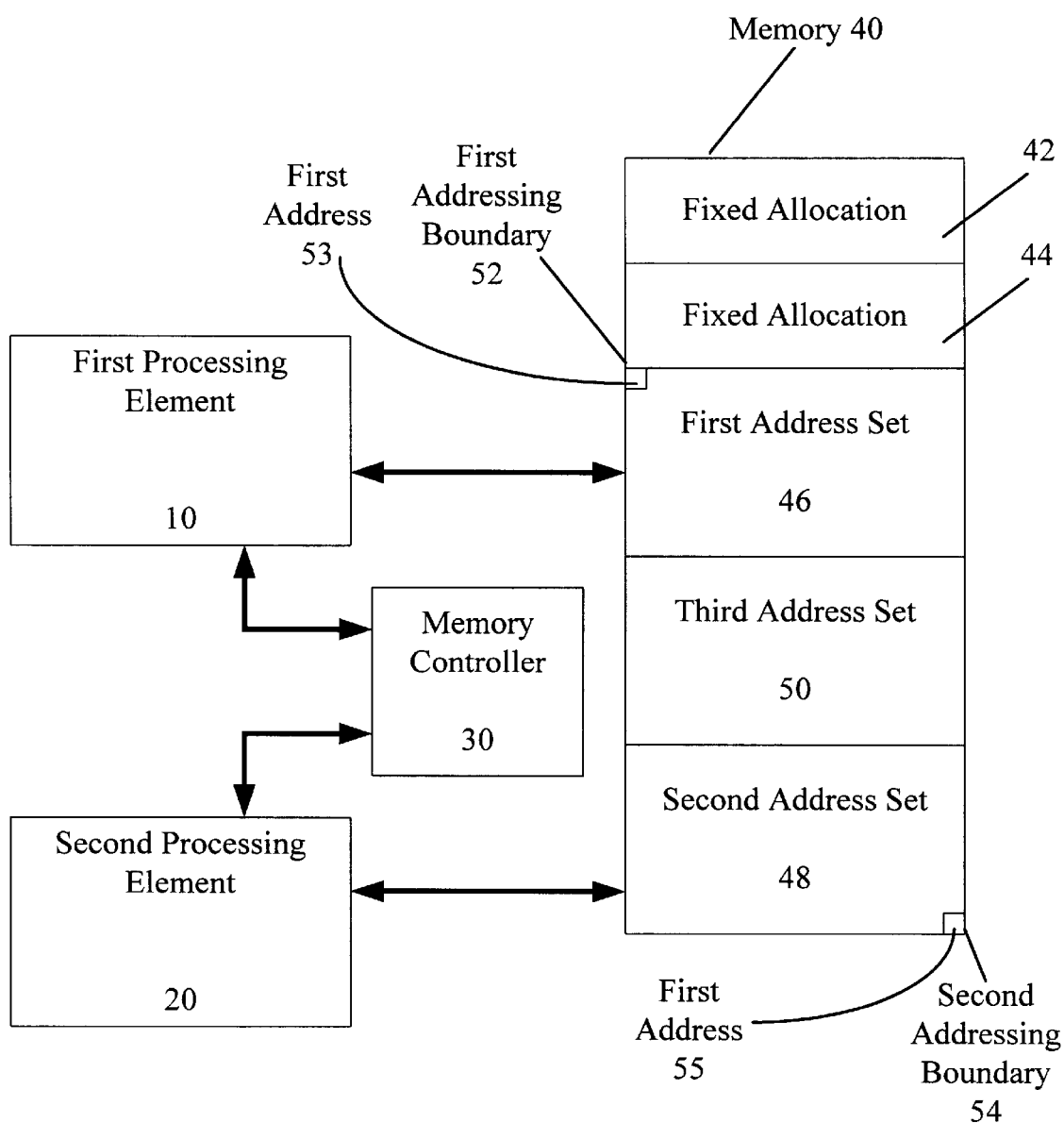
FIG. 1 illustrates a schematic block diagram of a dynamically allocated memory system in accordance with the present invention.
Figure 2:
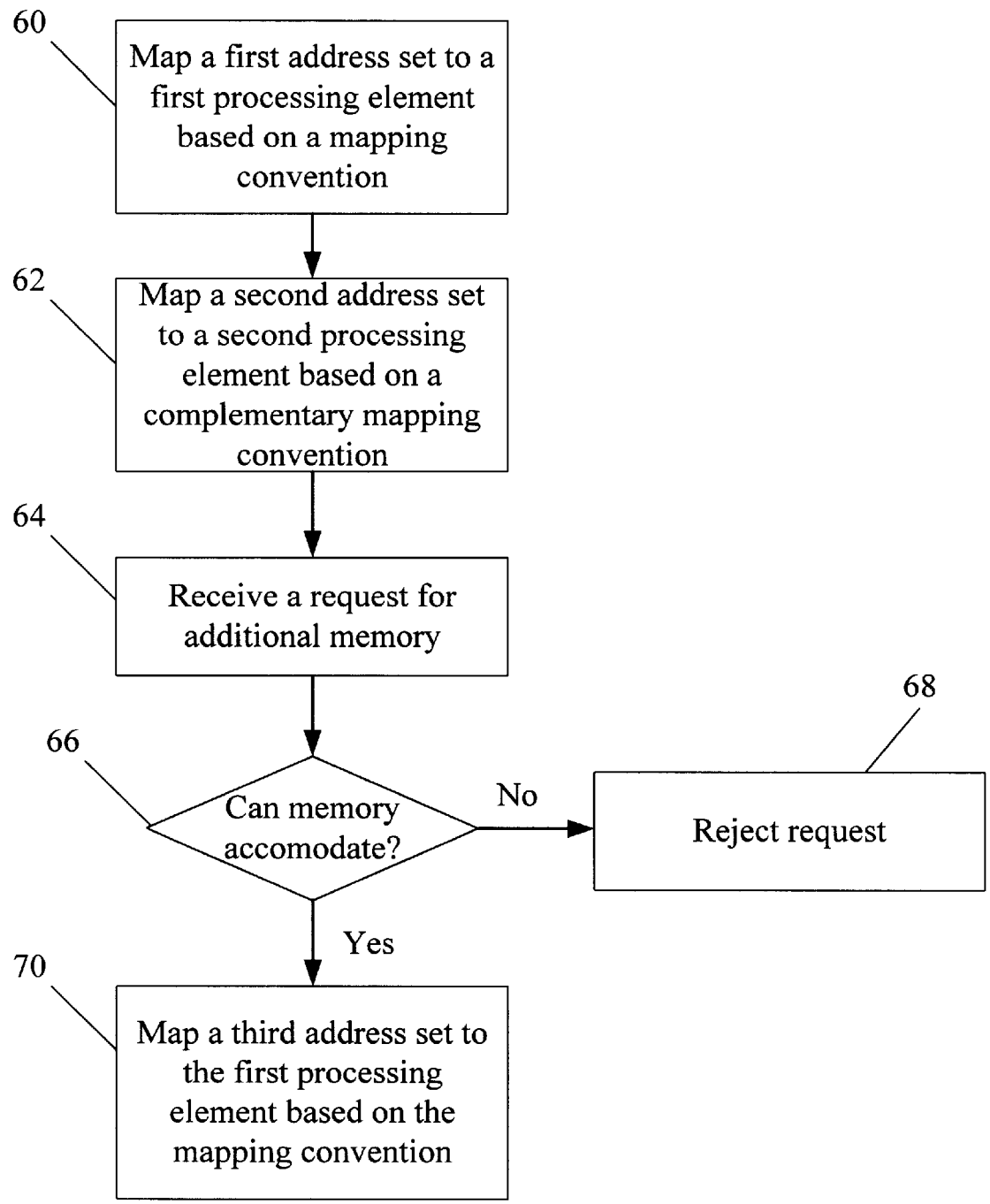
FIG. 2 illustrates a flow chart of a method for allocating memory to more than one processing element in accordance with the present invention.
Figure 3:
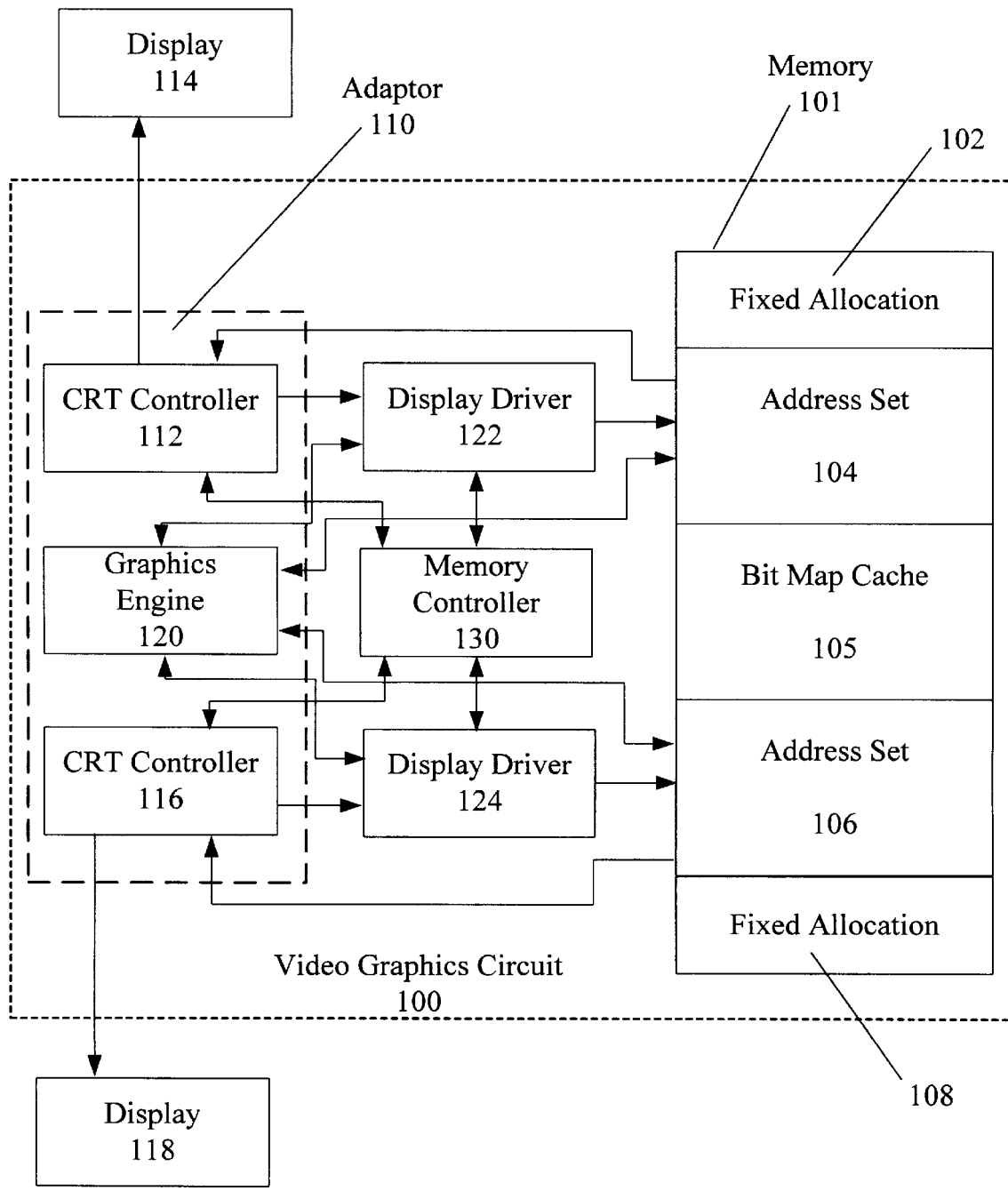
FIG. 3 illustrates a schematic block diagram of a video graphics circuit in accordance with the present invention.

The present invention can be more fully understood with reference to FIGS. 1–3. FIG. 1 illustrates a dynamically allocated memory system that includes a first processing element 10, a second processing element 20, a memory controller 30, and a memory 40.

The memory 40 includes memory locations addressable by a plurality of addresses that are bounded by a first addressing boundary 52 and a second addressing boundary 54. The memory locations whose addresses are included in this bounded plurality may be a portion of the total number of locations that are present within the memory. The memory controller 30 maps a first address set 46 of the plurality of addresses to the first processing element 10 based on a mapping convention. The mapping is such that the first address 53 of the first address set 46 corresponds to the first address boundary 52. The initial mapping may be based on standard start-up memory requirements of the first processing element 10, on an initial allocation request by the first processing element 10, or on other criteria received by or present within the memory controller 30.

Similarly, the memory controller 30 maps a second address set 48 of the memory 40 to the second processing element 20 based on a complementary mapping convention. This mapping is performed such that the first address 55 of the second address set 48 corresponds to the second addressing boundary 54.

When the memory controller 30 receives a request from the first processing element 10 for additional memory and the plurality of addresses can accommodate the request for additional memory, the memory controller 30 maps at least a portion of the third address set 50 to the first processing element 10 based on the mapping convention. The third address set 50 is the portion of the memory 40 which lies between the first address set 46 and the second address set 48.

In one embodiment, the first address boundary 52 defines the lower limit of memory which is used for the flexible needs of the processors, while the second address boundary 54 defines the upper limit. In such an embodiment, the first address set 46 occupies the lower portion of memory and the mapping convention is such that incrementing physical locations with respect to the first processing element 10 are mapped to incrementing addresses within the first address set 46. The second address set 48 occupies the upper portion of memory and the complementary mapping convention is such that incrementing physical locations with respect to the second processor 20 are mapped to decrementing addresses within the second address set 48. In other words, successive memory addresses for the first processing element 10 count upwards from the smallest address value, while for the second processing element 20 they count downwards from the largest address value.

In another embodiment, the first and second processing elements are video controllers that are part of a video graphics circuit. In such an embodiment, the mapping convention may be a linear mapping, or the mapping convention may be based on tile mapping. Video graphics display data that is stored based on linear mapping would store the display data for a horizontal line sequentially in the memory 46. If the data is stored in the first address set 46, the first portion of the display data will be stored at the first address 53, and the display data will be stored contiguously to the point where the first address set 46 borders the third address set 50. If the display data is stored in the second address set 48, the first portion of the display data will be stored at the first address 55, and the display data will continue in reverse addressing order to the point where the first address set 46 borders the third address set 50.

Additional portions of memory 40 which lie outside of the address space defined by the first addressing boundary 52 and the second addressing boundary 54 may be used as fixed memory allocations. The addresses corresponding to these additional portions may fall before, after, or both before and after the addresses designated for the flexible demands of the processing elements. In FIG. 1, the fixed address allocations 42 and 44 are shown preceding the first addressing boundary 52. These fixed addresses may be used to store video graphics data or related data whose storage requirements do not change when associated with a particular change in the display characteristics.

An example can be used to illustrate the benefits provided by this type of memory mapping. In the example, a single video memory is available to two video controllers, and each of the video controllers has a set of fixed-length data that it stores in fixed memory allocations at the lower end of the memory. Assume that this results in 4 Megabytes of video memory for storing the display data associated with two displays, where each of the two displays is controlled by one of the video controllers. Initially, each of the two displays is of such a size and resolution that it requires 1 Megabyte of video memory. The first display is mapped linearly starting at the lower addressing boundary, which is defined by the point where the fixed memory allocations terminate. The second display is also mapped linearly starting at the upper boundary of the video memory, with physical locations on the screen corresponding to decrementing addresses in memory. This leaves 2 Megabytes of video memory that is currently unused between the display data for the two displays.

If the first display changes configuration such that its new resolution requires 2.5 Megabytes of memory, the memory controller can reapportion the address space to allow the display data for the first display to consume the first 2.5 Megabytes of the 4 Megabytes of video memory, while the second display continues to utilize the last 1 Megabyte. In another case, the first display may reduce its memory needs to 0.5 Megabyte, and the second display may increase its needs to 3.5 Megabytes. By addressing the memory from both ends of the addressing space, free memory will always be located between the two portions in use, and additional allocations will be contiguous with the blocks currently in use such that linear and tiled mapping conventions can be used.

In video graphics systems, this flexibility of use of the video memory is highly advantageous. In a system that maps the display data for the second display in addresses immediately after those of the first display, the display data for the first display has no space for expansion into adjacent memory. This is very limiting in video graphics systems that require linear or tile-based mapping in order to meet speed requirements.

Further, the sharing of the memory allows for added flexibility for video memory expansion without requiring as much memory as would be required if each display were mapped to an individual memory. If, in the example above, each video controller mapped its corresponding display to a separate 2-Megabyte video memory (4 Megabytes total), neither screen would be able to exceed the 2-Megabyte memory limitation. In the system described herein, the limiting factor is the total memory usage by the two video controllers combined. Thus, combinations where one display is mapped to more than half of the memory are possible, and therefore in a system with 4 Megabytes of shared video memory, the displays are only limited to 2 Megabytes each if both are actually requesting the full 2 Megabytes.

FIG. 2 illustrates a flowchart of a method for allocating memory to more than one processing element. The process begins at step 60 where a first address set of a plurality of addresses in the memory are mapped to a first processing element based on a mapping convention. The plurality of addresses in the memory is bounded by a first addressing boundary and a second addressing boundary. In one embodiment, the first addressing boundary represents the lower address boundary of the memory and the second addressing boundary represents the upper address boundary, but in another embodiment, the opposite may be the case. When the first address set is mapped to the first processing element, the first address of the first address set corresponds to the first addressing boundary. In other words, if the first addressing boundary represents the lower address boundary, the first address of the mapping will correspond to the lowest address of the plurality of addresses. If this is true, the mapping convention maps incrementing physical locations to incrementing addresses within the first address set.

At step 62, a second address set of the plurality of addresses is mapped to a second processing element based on a complementary mapping convention. The second address set is mapped such that the first address of the second set corresponds to the second addressing boundary, which, as described above, could correspond with either the lower address boundary or the upper address boundary. In an embodiment where it corresponds to the upper address boundary, the complementary mapping convention maps incrementing physical locations to decrementing addresses within the second address set.

The process then proceeds to step 64, where a request for additional memory is received from the first processor. At step 66, it is determined whether the plurality of addresses can accommodate the request. This determination will be based on whether or not there are enough unused locations in the memory between the first address set and the second address set to accommodate the request. If there are not, the system may reject the request at step 68. In other embodiments, the system may be structured such that the status of the memory is monitored by the processing elements and requests that cannot be accommodated are not made.

At step 70, if the plurality of addresses includes a sufficient amount of free memory that the request can be accommodated, at least a portion of a third address set is mapped to the first processing element based on the mapping convention, where the third address set addresses lies between the first and second address sets.

The memory may also include addresses that are allocated to fixed memory allocations that border the first and second addressing boundaries. These fixed memory locations can be used to store parameters or other data whose storage requirements do not change when other memory requirements of the processing elements change. Because they do not need to be placed in the memory such that their size can be increased or decreased, the fixed memory allocations can be placed either before, after, both before and after, or in other locations remote from the memory space designated by the first and second addressing boundaries.

In specific embodiments, the processing elements may be video controllers, where the memory requirements of the first and second video controllers are for display data. The display data may be mapped linearly to the memory or it may be mapped to the memory based on tile mapping. The processing elements may also be computer processors that perform functions other than video processing that benefit from the availability of expansion memory for memory blocks that require real, contiguous address space.

FIG. 3 illustrates a video graphics circuit 100 that includes memory 101, CRT controllers 112 and 116, display drivers 122 and 124, graphics engine 120, and memory controller 130. Memory 101, which may be video memory, includes memory locations that are addressable by a plurality of addresses, where these addresses are bounded by a first addressing boundary and a second addressing boundary. Memory controller 130 maps either address set 104 or address set 106 to the CRT controller 112 based on a mapping convention, and maps the other address set to the CRT controller 116 based on a complementary mapping convention. The mapping convention used to map address set 104 maps sequential physical locations that are processed by a CRT controller to addresses in memory 101 based on a linear or tiled mapping that begins at the addressing boundary at the lowest address in address set 104 and increments address locations. Conversely, the mapping convention used to map address set 106 maps sequential physical locations that are processed by a CRT controller to addresses in memory 101 based on a linear or tiled mapping that begins at the addressing boundary at the highest address in address set 106 and decrements address locations.

Each of the CRT controllers 112 and 116 is coupled to one of the display drivers 122 and 124. Display drivers 112 and 116 write video graphics data to the memory 101 based on the address set 104 or 106 which has been mapped, or assigned, to its respective CRT controller 112 or 116. CRT controllers 112 and 116 receive the video graphics data from the memory 101 and provide it to displays 114 and 118, respectively. Each of the displays 114 and 118 may be a digital-to-analog converter (DAC) coupled to an analog display device such as a monitor or television, or may be another type of display device that is able to process digital input.

Video graphics circuit 100 may also include graphics engine 120 that performs graphics processing to produce video graphics data to be stored in the memory 101. Typically graphics engine 120 will perform functions such as image manipulation, color processing, two-dimensional layout and other complex graphics processing functions. In some embodiments, additional graphics engines may be employed such that each display driver has a corresponding graphics engine.

Multiple CRT controllers and graphics engines can be implemented on a single silicon chip. Thus, adapter 110 may represent a single chip implementation that includes CRT controllers 112 and 116 in addition to graphics engine 120. Combining these circuits on a single chip can enhance both performance and cost-effectiveness.

If the requirements of displays 114 and 116 change such that a different amount of video memory is needed to accommodate the new requirements, the CRT controller 112 or 116 for the altered display issues a request to the memory controller 130. Memory controller 130 first determines whether there is sufficient memory in the bit map cache 105 portion of the memory 101 to accommodate the request. The bit map cache 105 is the portion of the memory 101 which lies between the two address sets 104 and 108 which is currently not being used by either of the address sets 104 and 108. In the case where the display change reduces the memory requirements of the respective CRT controller 112 or 116, memory addresses will be released from the corresponding address set 104 or 106. These released memory addresses are then added to the bit map cache 105, which indicates that they are currently not in use.

In the case where the display change increases the memory requirements and there are a sufficient number of addresses in the bit map cache 105 to meet the increased memory requirements, the appropriate number of address locations will be added to the address set which stores video data for the changing display. The address locations that are added are those that border the current position of the address set assigned to the CRT controller driving the changing display. This is because video memory is typically mapped in continuous memory blocks in either linear or tiled fashion such that video data can be easily and quickly accessed.

Additional locations in the memory 101 may be used to store data that supports the graphics processing but requires no more than a fixed amount of memory. These fixed allocations 102 and 108 are stored in blocks outside of the memory area that is reserved for graphics data whose storage requirements may fluctuate. It may be preferable to store these blocks adjacent to the address sets 104 and 106 in order to use the memory 101 efficiently.

The foregoing discussion has described a method and apparatus for allocating memory in a multi-processor environment that uses memory resources efficiently while allowing for memory mapping conventions that require contiguous blocks of memory. By sharing memory resources, the processors in the system are able to increase the flexibility of their individual memory mapping options while using less memory than would be required if the memory resources were not shared. Thus, increased flexibility is achieved at a reduced cost. It will be appreciated that those of ordinary skill in the art will be able to devise various arrangements which, although not explicitly described or shown herein, embody the principles of the invention and are thus within its spirit and scope. For example, additional fixed memory sets can be included in the memory structures to support additional processors with fixed limitations. Similarly, additional flexible address sets can be interspersed throughout the memory space, allowing each of the address sets to increase it memory allocation to a degree limited by the proximity of its closest address-set neighbors.

What is claimed is:

1. A method for allocating memory to more than one processing element, the method comprising:

mapping a first address set of a plurality of addresses of the memory to a first processing element based on a mapping convention, wherein the plurality of addresses is bounded by a first addressing boundary and a second addressing boundary, wherein a first address of the first address set corresponds to the first addressing boundary;

mapping a second address set of the plurality of addresses to a second processing element based on a complementary mapping convention, wherein a first address of the second plurality of addresses corresponds to the second addressing boundary; and when the first processing element requests additional memory and the plurality of addresses can accommodate the additional memory, mapping at least a portion of a third address set of the plurality of addresses to the first processing element based on the mapping convention, wherein the third address set lies between the first and second address sets.

2. The method of claim 1 further comprises allocating additional addresses of the memory to fixed memory allocations bordering at least one of the first and second addressing boundaries.

3. The method of claim 1, wherein the steps of mapping further comprise:

mapping the first address set to the first processing element, wherein the first processing element is a first video controller; and mapping the second address set to the second processing element, wherein the second processing element is a second video controller, wherein memory requirements of the first and second video controllers are for display data, wherein display data is linearly mapped to the memory.

4. The method of claim 1, wherein the steps of mapping further comprise:

mapping the first address set to the first processing element, wherein the first processing element is a first video controller; and mapping the second address set to the second processing element, wherein the second processing element is a second video controller, wherein memory requirements of the first and second video controllers are for display data, wherein display data is mapped to the memory based on tile mapping.

5. The method of claim 1, wherein the mapping convention maps incrementing physical locations to incrementing addresses within the first address set and the complementary mapping convention maps incrementing physical locations to decrementing addresses within the second address set.

6. The method of claim 1, wherein the mapping convention maps incrementing physical locations to decrementing addresses within the first address set and complementary mapping convention maps incrementing physical locations to incrementing addresses within the second address set.

7. The method of claim 1, wherein the steps of mapping further comprise:

mapping the first address set to the first processing element, wherein the first processing element is a first computer processor; and mapping the second address set to the second processing element, wherein the second processing element is second computer processor.

8. A dynamically allocated memory system comprising:

a first processing element;

a second processing element;

a memory operably coupled to the first and second processing elements, wherein the memory includes memory locations addressable by a plurality of addresses, wherein the plurality of addresses is bounded by a first addressing boundary and a second addressing boundary; and a memory controller operably coupled to the first processing element, the second processing element and the memory, wherein the memory controller maps a first address set of the plurality of addresses of the memory to the first processing element based on a mapping convention, wherein a first address of the first address set corresponds to the first addressing boundary, wherein the memory controller maps a second address set of the plurality of addresses to the second processing element based on a complementary mapping convention, wherein a first address of the second address set corresponds to the second addressing boundary, wherein when the first processing element requests additional memory and the plurality of addresses can accommodate the additional memory, mapping at least a portion of a third address set of the plurality of addresses to the first processing element based on the mapping convention, wherein the third address set lies between the first and second address sets.

9. The dynamically allocated memory system of claim 8, wherein the memory includes additional addresses that are allocated to fixed memory allocations bordering at least one of the first and second addressing boundaries.

10. The dynamically allocated memory system of claim 8, wherein the first and second processing elements are video controllers, wherein memory requirements of the video controllers are for display data.

11. The dynamically allocated memory system of claim 10, wherein display data is linearly mapped to the memory.

12. The dynamically allocated memory system of claim 10, wherein display data is mapped to the memory based on tile mapping.

13. The dynamically allocated memory system of claim 8, wherein the mapping convention maps incrementing physical locations to incrementing addresses within the first address set and the complementary mapping convention maps incrementing physical locations to decrementing addresses within the second address set.

14. The dynamically allocated memory system of claim 8, wherein the mapping convention maps incrementing physical locations to decrementing addresses within the first address set and the complementary mapping convention maps incrementing physical locations to incrementing addresses within the second address set.

15. The dynamically allocated memory system of claim 8, wherein the first and second processing elements are computer processors.

16. A video graphics circuit comprising:

a first CRT controller;

a second CRT controller;

a memory, wherein the memory includes memory locations addressable by a plurality of addresses, wherein the plurality of addresses is bounded by a first addressing boundary and a second addressing boundary;

a memory controller operably coupled to the first CRT controller, the second CRT controller and the memory, wherein the memory controller maps a first address set of the plurality of addresses of the memory to the first CRT controller based on a mapping convention, wherein a first address of the first address set corresponds to the first addressing boundary, wherein the memory controller maps a second address set of the plurality of addresses to the second CRT controller based on a complementary mapping convention, wherein a first address of the second address set corresponds to the second addressing boundary, wherein when the first CRT controller requests additional memory and the plurality of addresses can accommodate the additional memory, mapping at least a portion of a third address set of the plurality of addresses to the first CRT controller based on the mapping convention, wherein the third address set lies between the first and second address sets;

a first display driver operably coupled to the first CRT controller, the memory controller, and the memory, wherein the first display driver writes first video graphics data to the memory based on at least the first address set; and a second display driver operably coupled to the second CRT controller, the memory controller, and the memory, wherein the second display driver writes second video graphics data to the memory based on at least the second address set.

17. The video graphics circuit of claim 16 further comprising a graphics engine operably coupled to the first and second display drivers and the memory, wherein the graphics engine performs graphics processing to produce at least a portion of the first and second video graphics data.

* * * * *